United States Patent [19]

Dragunevicius et al.

[11] Patent Number: 4,556,763
[45] Date of Patent: Dec. 3, 1985

[54] SIMPLIFIED LINE SWITCH FOR A TELEPHONE SET

[75] Inventors: Algirdas J. Dragunevicius; Gerd Kuhfus; Charles R. S. Walker, all of London, Canada

[73] Assignee: Northern Telecom Limited, Montreal, Canada

[21] Appl. No.: 488,439

[22] Filed: Apr. 25, 1983

[51] Int. Cl.[4] .............................................. H04M 1/08
[52] U.S. Cl. .................................. 179/164; 179/100 D
[58] Field of Search .................... 179/164, 159, 100 C, 179/100 D, 100 R

[56] References Cited

U.S. PATENT DOCUMENTS

| | | | |
|---|---|---|---|
| 4,152,554 | 5/1979 | Perry | 179/164 |
| 4,268,726 | 5/1981 | Chu | 179/164 |
| 4,292,477 | 9/1981 | Adams et al. | 179/100 C |
| 4,317,968 | 3/1982 | Kuhfus | 200/5 R |

FOREIGN PATENT DOCUMENTS 2920262 11/1980 Fed. Rep. of Germany ...... 179/159

Primary Examiner—Thomas W. Brown
Attorney, Agent, or Firm—Sidney T. Jelly

[57] ABSTRACT

A line switch assembly for a telephone switch has a unitary switch having a base within which are cantilevered contacts and a cap over the base, the cap having cam formations which actuate the contacts on reciprocal movement of the cap. An actuating member rests on the cap and has an extension with a rib which extends up into a recess in the top housing of the telephone set, the recess being one which accepts one of the handset transducers. Pressure on the rib pivots the actuating member and depresses the cap. The switch is a preassembled unit and is normally mounted on a circuit board carrying other components. A reduced number of components and quicker and easier assembly give a relatively high cost reduction.

3 Claims, 3 Drawing Figures

SIMPLIFIED LINE SWITCH FOR A TELEPHONE SET

This invention relates to a simplified line switch for a telephone set. In particular the invention replaces as assembly of several parts by a preassembled switch and a pivotally mounted actuating member.

The line switch, in telephone sets, is normally actuated from one condition to another by the handset. Removal of the handset results in the line switch going to an Off Hook condition, replacement of the handset resulting in the line switch reverting to an On Hook condition. The switch is actuated by a pivotally mounted actuating member which is moved by the handset via a projection extending up through the telephone set housing. Pivoting of the actuating member actuates the switch. A spring biases the actuating member upwards, to an Off Hook position, the actuating member being pivoted against the spring bias when the handset is replaced, or when the projection on the actuating member is depressed by other means. The conventional assembly comprises a switch, actuating member, spring connector for connecting the switch to a line circuit, and other minor items such as screws. The switch is of the type in which a plurality of cantilever spring contact members extend laterally from the switch body, the actuating member acting on the ends of various ones of the spring contact members to provide switch actuation.

The modified telephone set uses a switch having vertically extending cantilever spring contacts having a vertically movable cap with cams which actuate the spring contacts. This is a preassembled unit which is inserted on a circuit board and retained, as by soldering. A typical switch is as described in U.S. Pat. No. 4,317,968, issued Mar. 2, 1982 in the name of the present assignee. An actuating member rests on top of the switch and has an extension which projects up through the telephone set housing. The cap of the switch is biased upwards, the actuating member pressing the cap down against this bias, to actuate the switch when the extension is depressed.

The invention will be readily understood by the following description of an embodiment, in conjunction with the accompanying drawings, in which.

Figure 1:
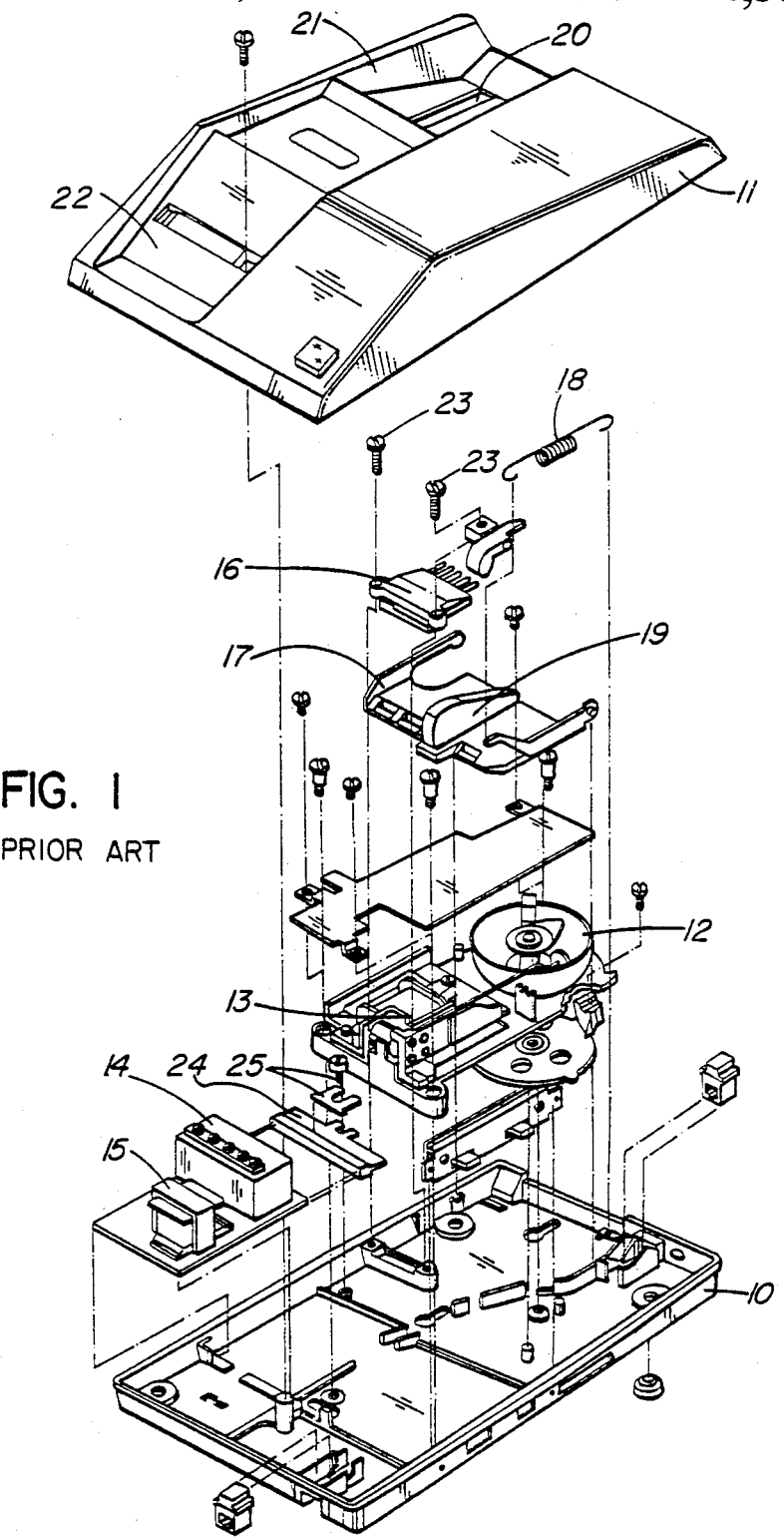
FIG. 1 is an exploded perspective view of the conventional telephone set base.

Illustrated in FIG. 1 is a conventional telephone set base having a bottom housing 10 and a top housing 11. Between the two housings are inserted various devices, including, for example, a gong 12 with its operating mechanism 13, a line circuit 14 and associated transformer 15, a line switch 16, a switch actuator 17 and biasing spring 18. An upwardly projecting rib 19 on the actuator 17 extends up through a slot 20 in one of two recesses 21 and 22 in the top housing 11. When a handset is replaced on the base one of the transducer housings, usually the one housing the transmitter, rests in the recess 21 and pushes down on the rib 19. This pivots the actuator 17 and actuates the switch 16. There are also various fastening screws 23 and a connector 24 with fastening means 25.

Thus the line switch and related items amount to a fairly considerable number of items, each of which is individually assembled. This results in both piece parts costs and labour costs.

Figure 2:
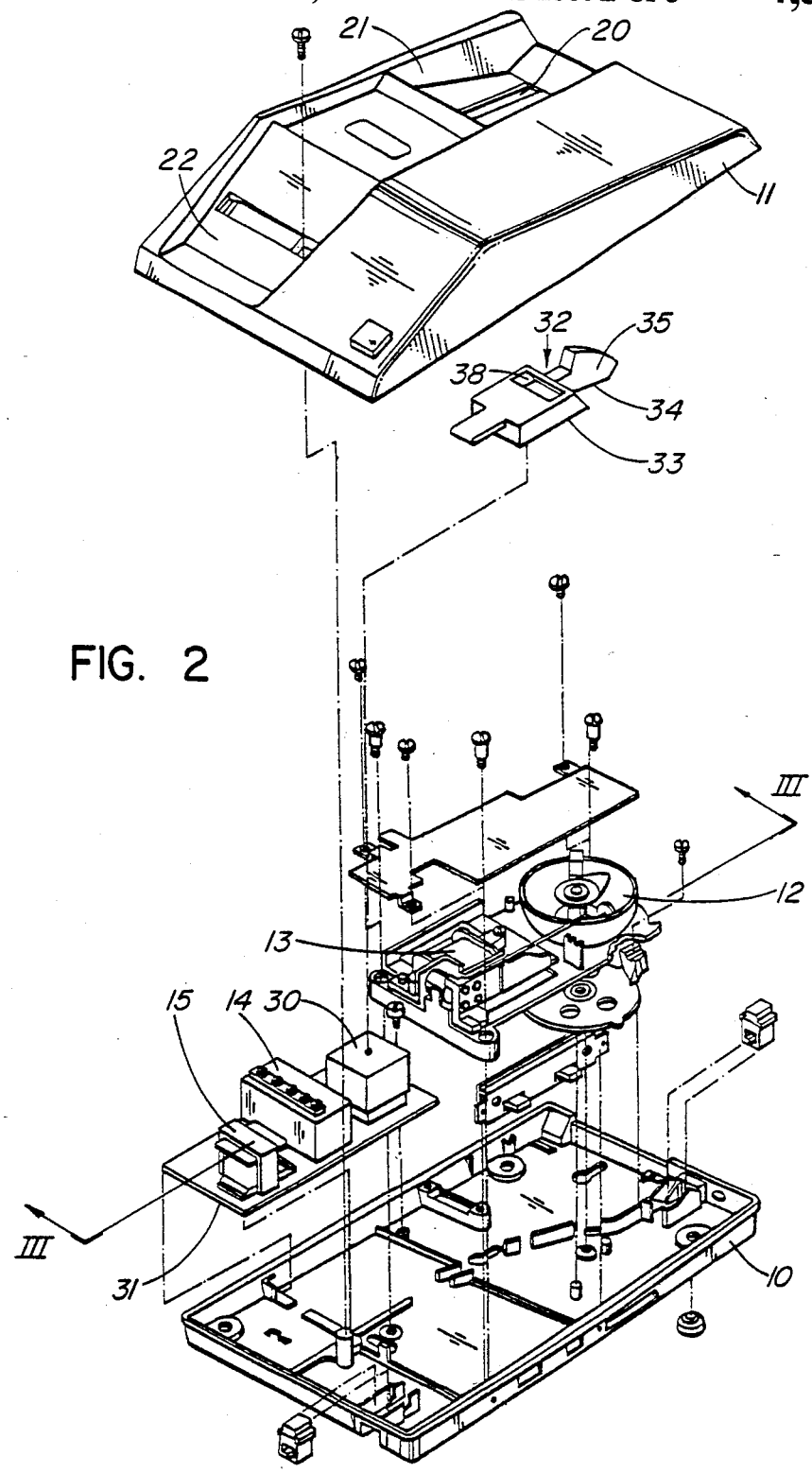
FIG. 2 is a view similar to that of FIG. 1 of the modified telephone set base, showing the new line switch.

The present invention reduces the number of parts, or items required and also reduces the amount of assembly required. FIG. 2 illustrates a modified form of the telephone set base illustrated in FIG. 1. Common reference numerals are used for common items. The line switch, in the present invention, is of the type in which cantilever contact members which extend vertically and are actuated by a vertically moving cap having cams which actuate the contact members. The switch is indicated at 30 and is described in detail in the aforementioned U.S. Pat. No. 4,317,968, the disclosure of which is incorporated herein by specific reference.

The switch 30 is mounted on an extension of the circuit board 31, which carries the line circuit 14 and transformer 15. The switch is mounted by insertion of terminals extending from the switch base and extend through holes in the circuit board 31, being soldered to the circuit on the under side of the circuit board. An actuating member 32 rests on the switch 30. The actuating member has a concave center portion 33 which fits over the cap of the switch and a laterally extending arm 34 which has an upwardly extending rib 35 at its end. The rib 35 extends up through the slot 20 in the top housing 11. A further arm 36 extends from the center portion in a direction opposite to that of arm 34.

Figure 3:
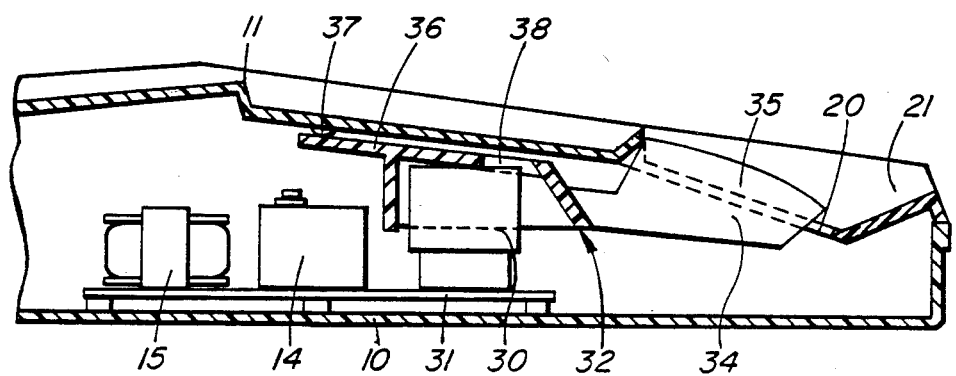
FIG. 3 is a cross-section, on the line III—III of FIG. 2, with the top and bottom housings assembled, illustrating the line switch and actuating member.

The arrangement of the switch and actuating member is seen more clearly in FIG. 3. The cap of the switch 30 is biased upwards by a spring contained within the switch and this biases the actuating member to an Off Hook condition, as illustrated in FIG. 3. Replacement of the handset depresses the rib 35 and causes the actuating member 32 to press down the cap of the switch, actuating the contacts.

The actuating member pivots at the end of the arm 36 on a rib 37 on the underside of the top housing 11. The arm 36 is arranged to press on the center of the cap of switch 30 by providing a cut out or aperture 38 in the arm.

The switch 30 can be assembled by automatic assembly and comes as a preassembled unit. The switch is preassembled to the circuit board 31, and this can also be by an automatic assembly apparatus. The only hand labour required at final assembly is the positioning of the actuating member over the switch, prior to assembling the top housing to the bottom housing. The number of parts and the assembly time are both considerably reduced. Minimal modifications to the housing need be made, and if desirable, no modifications need be made. The rib 37 could be omitted, and the rib 35 modified to use an existing slot 20. It is possible to replace existing line switches and actuating members by the arrangement of the present invention, at any time, for example if the existing line switch becomes faulty.

The description of this invention has been based on the positioning of the telephone set base as illustrated in the drawings, that is, resting on a horizontal surface. The invention can also be used when the telephone set is mounted on a vertical surface. Therefore the terms laterally, upwardly, upwards and other similar directional terms should be interpreted to include the appropriate directions when the telephone set base is mounted on a vertical surface.

What is claimed is:

1. A line switch assembly for a telephone set, comprising:
   a bottom housing;
   a circuit board mounted on the bottom housing;
   a switch assembly mounted on said circuit board and including a base and a cap on said base, said cap moveable in a direction normal to the circuit board and biased away from said circuit board;
   a top housing extending over said bottom housing, and said circuit board, said top housing including a recess at one end for reception of a transducer housing of a handset, said recess displaced laterally from said switch assembly and having a bottom surface;
   a slot in said bottom surface of said recess;
   an actuating member resting over said cap, between said switch assembly and said top housing, said actuating member including an extension on one side extending beneath said recess and an arm extending from another side in an opposite direction to said extension;
   said extension including a rib extending through said slot in said bottom surface of said recess;
   said arm on said actuating member including a pivotal position at an outer end of said arm, said pivotal position being in contact with said top housing;
   the arrangement such that pressure on said rib pivots said actuating member about said pivotal position to depress said cap towards said circuit board and actuate said switch assembly.

2. An assembly as claimed in claim 1, said actuating member including a concave center portion, said concave center portion positioned over said cap.

3. An assembly as claimed in claim 1, including a rib on an undersurface of said top housing, said end of said arm in contact with said rib and pivotal on said rib.

* * * * *